United States Patent [19]
De Palma et al.

[11] 3,729,936
[45] May 1, 1973

[54] METHOD AND MEANS FOR CATALYTICALLY TREATING ENGINE EXHAUST GASES

[75] Inventors: Ted V. De Palma, Roselle, Ill.; Martin W. Perga, Billings, Mont.

[73] Assignee: Universal Oil Products Company, Des Plaines, Ill.

[22] Filed: May 24, 1971

[21] Appl. No.: 146,216

[52] U.S. Cl. ............... 60/274, 23/288 F, 423/213, 60/301
[51] Int. Cl. ............................................. F01n 3/14
[58] Field of Search ............... 60/301, 274; 23/2 E, 23/288 F; 423/213

[56] References Cited

UNITED STATES PATENTS

| 1,902,160 | 3/1933 | Frazer | 60/301 |
| 3,228,746 | 1/1966 | Howk | 60/301 |
| 3,656,915 | 4/1972 | Tourtellotte | 23/2 E |

Primary Examiner—Douglas Hart
Attorney—James R. Hoatson, Jr. and Ronald H. Hausch

[57] ABSTRACT

The method and means for catalytically treating engine exhaust gases which utilize a catalytic converter having a single bed of catalyst material which has an upstream reduction zone and a downstream oxidation zone. Air is introduced into the oxidation zone of the catalyst material in a direction generally transverse to the direction of flow of the exhaust gases. The engine is operated in a manner to maintain the content of the untreated exhaust gases generally low in oxygen and high in carbon monoxide. Therefore, the nitrogen oxides in the untreated exhaust gases are reduced by the carbon monoxide in the exhaust in the upstream zone of the bed and the air is admixed with exhaust gases to oxidize the hydrocarbons and carbon monoxide in the downstream zone of the bed.

5 Claims, 3 Drawing Figures

Patented May 1, 1973  3,729,936

INVENTORS:
Ted V. DePalma
Martin W. Perga

BY: James R. Hoatson, Jr.
Ronald H. Hausch
ATTORNEYS

000
METHOD AND MEANS FOR CATALYTICALLY TREATING ENGINE EXHAUST GASES

BACKGROUND OF THE INVENTION

The present invention relates to an improved method and means for catalytically treating an engine exhaust gas stream. More specifically, the improved system provides for the catalytic reduction of nitrogen oxides in a first zone of the single bed reactor and for the substantially complete oxidation of carbon monoxide and residual hydrocarbons in a second zone of the same bed of catalyst material.

The desirability of removing or converting noxious compounds of vehicular exhaust gases has been generally well established. The unavoidable incomplete combustion of hydrocarbon fuel via a gasoline or diesel engine results in the generation of substantial quantities of unburned hydrocarbons, oxides of nitrogen, and other undesirable products, which as waste products discharge into the atmosphere through the exhaust line. With the ever-increasing concentration of automobiles, particularly in urban areas, the resulting accumulation of these undesirable products in the atmosphere may reach high proportions. These combustion products are known to react with atmospheric gases to produce smog or pollution. Such waste products include, for example, saturated and unsaturated hydrocarbons, carbon monoxide, aromatics, partially oxygenated hydrocarbons, such as aldehydes, ketones, alcohols, and acids, as well as oxides of nitrogen and sulfur. In a catalytic operation, hot gases issuing from the engine exhaust manifold are passed through a catalytic compartment or conversion zone maintained within a converter, so as to effect a more or less complete conversion of the waste products in the exhaust to a harmless state. One of the problems of past systems has been the inability to provide for a conversion system where both the oxides of nitrogen are reduced, and the hydrocarbons and carbon monoxide in the exhaust gases are oxidized to harmless states. Prior art schemes have used dual zone systems wherein either two converters were utilized or two stages of catalytic material were used in a single housing to produce the effect of two converters. Typically, in these prior art schemes the exhaust gases issuing from the internal combustion engine were first passed through one catalyst bed wherein the nitrogen oxides were reduced to nitrogen in the presence of a carbon monoxide and a reduction catalyst, then secondary air was admixed with the partially treated gases, and finally, the total gas stream was passed through a second catalyst bed. In the second catalyst bed, the carbon monoxide and hydrocarbons were oxidized in the presence of an oxidizing catalyst. These schemes have proved to be far too cumbersome in design and consequently prohibitive in cost. Furthermore, the mixing of air and exhaust gases may have been incomplete, thus adversely affecting the efficiency of oxidation in the second bed.

SUMMARY OF THE INVENTION

It is thus the principal object of the present invention to provide for the method and means for catalytically treating engine exhaust gases which will remove the nitrogen oxides (NOx) as well as carbon monoxide (CO) and hydrocarbons from the stream of exhaust gases.

It may also be considered an object of this invention to provide for a method of operating an internal combustion engine system wherein harmful exhaust gases from the engine are catalytically converted to generally harmless components.

More particularly, it is an object of this invention to provide the method and means for catalytically treating engine exhaust gases utilizing a single bed of catalytic material wherein air is introduced in a direction generally transverse to the direction of flow of the exhaust gases through the bed of catalyst.

The present invention operates on the general principle that nitrogen oxides can be reduced and removed by an overall type reaction of the nature of:

$$2\,CO + 2\,NO \rightarrow N_2 + 2\,CO_2$$

and the carbon monoxide and the hydrocarbons may be oxidized by oxygen to carbon dioxide and water by the overall type reactions of the nature of:

$$CH_4 + 2\,O_2 \rightarrow CO_2 + 2\,H_2O$$

$$2\,CO + O_2 \rightarrow 2\,CO_2$$

Thus, in one of its broad aspects the present invention provides for a method of operating an internal combustion engine system wherein the engine's harmful exhaust gases, including carbon monoxide, hydrocarbons, and nitrogen oxides are catalytically converted to generally harmless components comprising the steps of: (a) operating said internal combustion engine in a manner to maintain the content of the untreated exhaust gases generally low in oxygen and high in carbon monoxide; (b) passing the untreated exhaust gases from said engine through a singular bed of catalyst material, said bed of catalyst material having an upstream reducing zone and a downstream oxidation zone; (c) introducing air into the oxidation zone of said bed of catalyst material in a direction generally transverse to the direction of flow of said exhaust gases, whereby the nitrogen oxides in the untreated exhaust gases are reduced by the carbon monoxide in the upstream zone of said bed and the air is admixed with the exhaust gases in sufficient quantities to oxidize the hydrocarbons and carbon monoxide in the downstream zone of said bed.

To maintain the content of the untreated exhaust gases generally low in oxygen and high in carbon monoxide, the engine is preferably operated with an air/fuel ratio on the rich side of the stoichiometric (rich referring to excess fuel) which can be accomplished by adjustment of the carburetion setting, timing, etc. It is also contemplated to utilize fuel injection as well as other conventional means to supply the engine with the necessary ratios of air to fuel. For purposes of this invention, "generally low in oxygen and high in carbon monoxide" should be construed to refer to the major portions of the operating cycle of the engine since present technology and economics limits the possibility of teaching this goal during all modes.

The catalyst material to be utilized in the oxidation and reducing zones preferably is a single catalyst of one composition. On the other hand, a catalyst that principally acts as an oxidation catalyst may be utilized in the oxidation zone and a reduction catalyst may be utilized in the reduction zone; however, problems may develop when utilizing two different types of catalysts in a single bed. One such problem is associated with the mixing of the two types that may occur when a converter is installed on the automobile itself, especially if the catalysts have different densities.

A wide variety of metals and metal oxides, either alone or in combination have been recognized for their ability to catalyze the conversion of carbon monoxide, hydrocarbons, and nitrogen oxides occurring in automobile exhaust gases. Such materials may be supported on a refractory inorganic oxide carrier material. In particular, copper oxide or copper oxide promoted with other metal oxides including iron, cobalt, chromium, magnesium, cerium, vanadium, and nickel oxides supported on an alumina carrier material have been shown to be effective to catalyze the desired conversion reactions of this improved method. Of course, it is not intended to limit the present invention to any one type of catalyst.

The present method allows one to use a single, relatively small converter to both reduce the NOx gases and oxidize the CO and hydrocarbons. Air sparge tubes may be disposed in a catalyst bed in a plane generally transverse to the directional flow of exhaust gases to introduce the air into the oxidation zone of the catalyst material. The present method also places the oxidation and reducing zones in direct heat exchange relationship with each other, therefore maintaining maximum retention of heat within the bed of catalyst material.

Therefore, another aspect of this invention provides for a catalytic converter for treating exhaust gases of an internal combustion engine. Such a converter comprises in combination: (a) an outer housing; (b) a catalyst compartment in said outer housing; (c) distribution and collection means connected to said catalyst compartment for passing the exhaust gases therethrough; (d) an air sparge tube disposed in said catalyst compartment in a plane generally transverse to the direction of flow of said exhaust gases and being spaced therein to form an upstream section and a downstream section, said air sparge tube having perforation means for supplying air to the downstream section of said catalyst compartment; and, (e) means for supplying air to said air sparge tube.

In most instances the catalyst compartment size will dictate a plurality of air sparge tubes all disposed in the same plane which is transverse to the direction of flow of exhaust gases. The perforation means may comprise openings on opposite sides of the air sparge tubes which direct the flow of air transverse to the direction of flow of the exhaust gases through the converter. Of course, suitable catalyst material would be disposed in the catalyst compartment.

The catalyst material to be utilized in the converter of this invention is preferably a single catalyst composition supported on a refractory inorganic oxide carrier material. Of course, it is not intended to limit the present invention to any one type of catalyst.

It should be noted that the particular arrangement disclosed provides for a single bed of catalyst material that both reduces the nitrogen oxide and oxidizes the carbon monoxide in the hydrocarbons in the exhaust gases. By introducing the air through air sparge tubes within the catalyst compartment, a suitable mixing of air with the exhaust gases is carried out. The catalyst material serves to mix the air and exhaust gases efficiently at the most important location, the place of reaction. In other words, by introducing air into the catalyst material itself through the air sparge tubes, there is suitable turbulence to efficiently mix the oxygen and the exhaust gases together and there is also a maximum retention of heat because of the direct heat exchange relationship between the two sections or zones in the catalytic converter, as well as indirect heat exchange relationship between the air sparge tubes and the catalyst material. It should be noted that perforation means or openings in the air sparge tubes may be spaced at varying intervals to promote proper introduction of air into the catalyst compartment.

Reference to the accompanying diagrammatic drawing and the following description thereof will serve to more fully illustrate the present invention as well as to set forth additional advantageous features in connection therewith.

Figure 1:
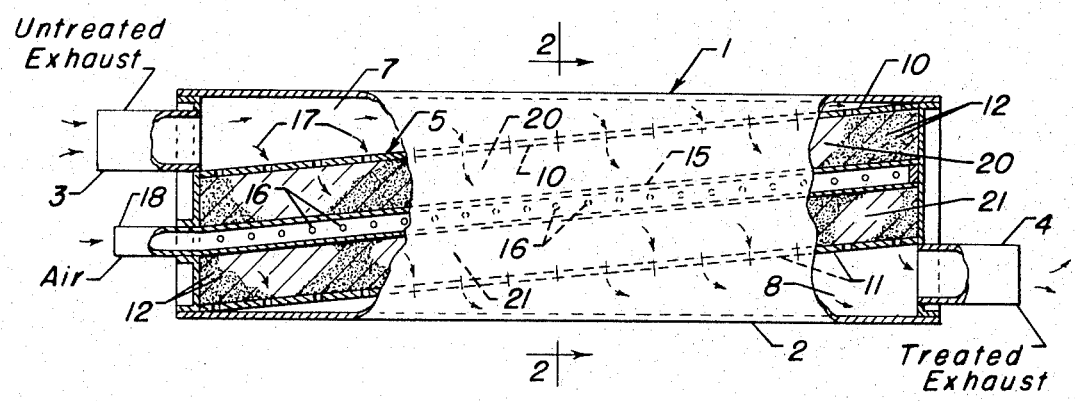
FIG. 1 of the drawing is a diagrammatic elevational view, shown partially in section, of a preferred embodiment of the converter of this invention.
Figure 2:
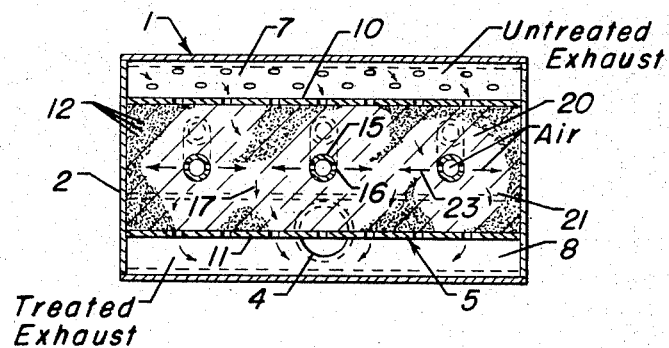
FIG. 2 is a cross-sectional view of the converter of FIG. 1 as taken along section lines 2—2 of FIG. 1.

Referring now more particularly to FIGS. 1 and 2 of the drawing there is shown a converter 1 which is comprised of an outer housing 2 having an inlet conduit 3 and outlet conduit 4 connected thereto. It should be noted that by indicating conduit 3 as an inlet conduit and conduit 4 as an outlet conduit, it should not be construed to be limiting upon this present improvement for the reverse is possible. It is also noted that the downward direction of flow shown is a preferred direction of flow through a converter and more particularly through the catalyst compartment of a converter since less attrition results. Converter 1 is further comprised of a catalyst compartment 5 which is formed by perforated partition 10 and a perforated partition 11. In this particular converter these partitions are spaced in such a manner to form inlet or distribution manifold 7 of changing cross-sectional area and an outlet or collection manifold 8 also of changing cross-sectional area. The manifolds as well as the inlet pipes serve as distribution and collection means for passing the exhaust gases through the catalyst compartment 5. Also included in this converter are air sparge tubes 15 which are disposed in the catalyst compartment 5 in a plane which is generally transverse to the direction of flow of exhaust gases through the converter as indicated by arrows 17. The air sparge tubes 15 are spaced in catalyst compartment 5 to form an upstream section 20 and a downstream section 21. Air sparge tubes 15 have perforations 16 or other forms of perforation means disposed therein for supplying air to the downstream section 21 of catalyst compartment 5. Preferably, although not to be limiting, the perforations or openings 16 are spaced along the sides of the air sparge tubes 15 as shown in FIG. 2 of the drawing. In this way, the general direction of air flow through the catalyst compartment is as shown in the drawing by arrows 23. Air sparge tubes 15 extend through the end section of the outer housing 2, and the unperforated end portion 18 of air sparge tubes 15 is adapted to be connected to air supply means (not shown) for supplying air to the air sparge tubes. The air supply means may be of a conventional form such as a pump, compressor or venturi system, well known by those skilled in the art. Control may be provided to vary the flow of air during different modes of engine operation. Of course the number of air sparge tubes utilized in any particular design depends on the size of the converter utilized as well as exhaust gas flow rates and composition. Also, of course, this number will depend on the particular type of catalyst material utilized in the converter and on the particular air flow rates possible without causing excessive cooling. Of course, it is contemplated to use one air sparge tube in the converter of this present arrangement as well as a plurality thereof.

Catalyst material 12 is disposed in the catalyst compartment 5. In regard to the particular type of catalyst material utilized in compartment 5, any suitable high temperature catalyst which will reduce the nitrogen oxides to nitrogen and carbon dioxide and which will oxidize the hydrocarbons and carbon monoxide will fall within the scope of this invention. Reference is made to the Summary of the Invention for particular examples. As to the form or shape, the catalyst may be supplied in the form of spheres, cylinders, or pellets which may be retained in the confined bed. Also, the catalysts may be in the form of impregnated fibers which in turn may be placed in a mat-like bed arrangement. Where spheres or pellets are used, then they shall have sufficient dimension, to be readily retained within the perforate catalyst compartment.

In accordance with this present invention, the engine exhaust flows into a converter via conduit 3 into the inlet or distribution manifold 7 and through the perforated partition 10 into the catalyst compartment 5. Preferably, these untreated exhaust gases are maintained so to have a low oxygen content and a generally high carbon monoxide content. This may be accomplished through conventional means such as operating the engine with an air/fuel ratio on the rich side of stoichiometric. We have found the best results occur when this air/fuel ratio is from about 13 to 14.8 pounds air per pounds of fuel during most modes of operation. The exhaust gases enter the converter and pass through the single compartment 5 of catalyst material 12. Since the catalyst compartment 5 has an upstream reduction zone 20 and a downstream oxidation zone 21, different reactions occur in the converter. The oxidation zone is maintained with proper amounts of oxygen by introducing air into such zone via air sparge tubes 16 in a direction generally transverse to the direction of flow of the exhaust gases and particularly via perforation means 16. Not to be limiting, the amount of air entering bed of catalysts is readily calculable by conventional means and is generally dependent on the amounts of hydrocarbons and CO that remain in the exhaust gas after the exhaust gases leave the reduction zone 20. Of course, normally excess air will be supplied to insure conversion of the hydrocarbons and CO. The nitrogen oxides are reduced in the presence of CO in the reduction zone 20 of the catalyst compartment and are changed to the generally harmless gases of carbon dioxide and nitrogen. Any remaining carbon monoxide and any hydrocarbons in the exhaust gases are oxidized in the downstream oxidation zone 21 of the bed. Since the direction of flow of air is generally transverse to the direction of flow of the exhaust gases, an efficient and fast mixing of oxygen and exhaust gases is accomplished in a relatively small space defined in a region close to the sparge tubes. Since the catalyst material is adjacent to the perforations 16 of the sparge tubes the admixing of oxygen and exhaust gases is almost immediate. This fact is one of the major advantages in utilizing the present method and means of converting exhaust gases. Furthermore, since both the reduction and oxidation of the components of the exhaust gases are accomplished in one reactor and in one catalyst compartment, greater retentions of the heat are possible because of the direct heat exchange relationship of the two zones as well as with the incoming air. Of course, after the gases are converted in catalyst compartment 5, the treated gases pass through perforate partition 11 into the collection or exhaust manifold 8 and out of the converter conduit 4 to the tail pipe of the exhaust system.

While in FIGS. 1 and 2 there is shown a generally flat rectangular bed of catalyst material, other shapes are possible and should be considered to be within the scope of this present improved apparatus. For example, a flat, circular, or pancake shaped catalyst compartment may well be utilized using the principles of this invention. The sparge tubes may either be circular or linear.

Figure 3:
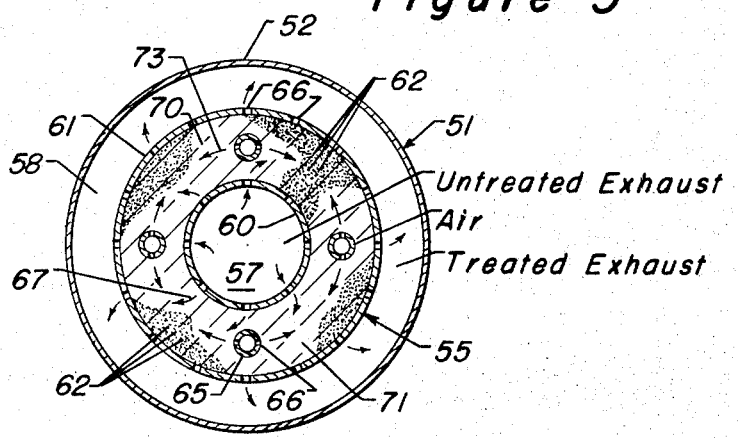
FIG. 3 is a diagrammatic cross-sectional view of a radial form converter of the present invention.

Other shapes are also considered to be within the scope of this invention. For example, in FIG. 3 there is shown a schematic cross-sectional view of annular type catalyst compartment 55 housed in a converter 51 comprised of an outer housing 52 with the inlets and outlets attached thereto not being shown. By way of example, perforate partition 60 forms one side of the catalyst compartment 65 and also the inlet manifold 57. A perforate partition 61 forms the outer wall of catalyst compartment 55. An outlet manifold 58 is formed by partition 61 and housing 52. Shown in section are four air sparge tubes 65 having perforation means or openings 66 therethrough. The sparge tubes are in the catalyst compartment 55 in a plane generally transverse to the direction of flow of the exhaust gases designated by the arrows 67 and spaced in the catalyst compartment 55 to form an upstream section 70 and a downstream section 71. The perforation means or openings 66 are for supplying air to the downstream section 71 of the catalyst compartment in the general flow pattern designated by arrows 73. Of course, means for supplying air to the air sparge tubes (not shown) is needed in conjunction with converter of FIG. 3. Catalyst material 62 is provided in the catalyst compartment 55. Of course, the principle of operation of the converter of FIG. 3 is the same as that of FIG. 1 and the converter operates in a similar manner. The exhaust gases issuing from the engine which is preferably operated to maintain a low oxygen and high carbon monoxide content is passed through catalyst material 62 in the single catalyst bed or compartment 55 having an upstream reduction zone 70 and a downstream oxidation zone 7. Air is introduced into the oxidation zone 7 of the bed through perforations 61 of air sparge tubes 65 in a direction generally transverse to the direction of flow 67 of the exhaust gases. In the reduction zone 70 the nitrogen oxides are reduced in the presence of the excess carbon monoxide in the exhaust gases and in the oxidation zone 71 the hydrocarbons and the remaining carbon monoxide are oxidized. The incoming air is uniformly and efficiently mixed with the contacted treated gases from the reduction zone 70 to establish very efficient oxidizing conditions in the oxidation zone 71. As was the case in the arrangement of FIGS. 1 and 2, the embodiment of FIG. 3 will permit the substantially total conversion of harmful components, such as nitrogens of oxide, hydrocarbons and carbon monoxide, in a single bed of catalytic material with substantial retention of heat and with efficient mixing of air and exhaust gases.

It is of course, not intended to limit the present invention to only the shapes and configurations shown in the accompanying drawing, or heretofore described, inasmuch as other shapes and structures will be obvious to one skilled in the art. Actually, a particular converter configuration will be dictated or required by engine design, space availability, etc.

A reactor similar to the configuration of FIGS. 1 and 2 having a catalyst retaining section with dimensions of about 2 × 7 × 14 inches was connected to a loaded standing engine and run through a series of seven mode cycles according to procedures defined by the Motor Vehicle Pollution Control Board of California. The catalyst used in the reactor was comprised of copper oxide and iron oxide impregnated on alumina spherical supports. The reactor had two parallel sparge tubes of three-eighths inch ID located about two-thirds of the distance from the inlet screen to the outlet screen. Thus, two-thirds of the retaining section was the reducing zone and one-third, the oxidation zone. Holes of diminishing size (from upstream to downstream end) were located on the sides of the sparge tubes. The total area of the holes was approximately equal to the open area of the sparge tubes, and the engine was operated with rich carburetion.

The reactor was initially operated with no additional air and the results were as follows:

| Percent Conversion | |
|---|---|
| Hydrocarbons | 40 |
| Carbon Monoxide | 40 |
| Oxides of Nitrogen | 75 |

The sparge tubes of the reactor were then continuously supplied with secondary air (from about 1 standard CFM to 3 standard CFM) and the improved results were as follows:

| Percent Conversion | |
|---|---|
| Hydrocarbons | 65 |
| Carbon Monoxide | 65 |
| Oxides of Nitrogen | 90 |

The results clearly show the improved results obtainable utilizing the inventive concept.

We claim as our invention:

1. A method of operation an internal combustion engine system wherein harmful exhaust gases from an internal combustion engine of said system, which include carbon monoxide, hydrocarbons, and nitrogen oxides, are catalytically converted to generally harmless components comprising the steps of:
   a. operating said internal combustion engine in a manner to maintain the content of the untreated exhaust gases generally low in oxygen and high in carbon monoxide;
   b. passing the untreated exhaust gases from said engine through a singular bed of catalyst material, said bed of catalyst material having an upstream reducing zone and a downstream oxidation zone;
   c. introducing air into the oxidation zone of said bed of catalyst material in a direction generally transverse to the direction of flow of said exhaust gases, whereby the nitrogen oxides in the untreated exhaust gases are reduced by the carbon monoxide in the upstream zone of said bed and the air is admixed with the exhaust gases in sufficient quantities to oxidize the hydrocarbons and carbon monoxide in the downstream zone of said bed.

2. The method of claim 1 wherein said catalyst material comprises a single reducing-oxidizing catalyst.

3. The method of claim 1 wherein said catalyst material comprises copper oxide and iron oxide impregnated on a support base.

4. A catalytic converter for treating exhaust of an internal combustion engine comprising in combination:
   a. an outer housing;
   b. a catalyst compartment in said outer housing;
   c. distribution and collection means connected to said catalyst compartment for passing the exhaust gases therethrough;
   d. an air sparge tube disposed in said catalyst compartment in a plane generally transverse to the direction of flow of said exhaust gases and being spaced therein to form an upstream section and a downstream section, said air sparge tube having a plurality of perforation means for supplying air in a direction transverse to the direction of flow of said exhaust gases to the downstream section of said catalyst compartment; and,
   e. means for supplying air to said air sparge tube.

5. The converter of claim 4 in that there is provided a plurality of air sparge tubes in said catalyst compartment in a plane generally transverse to the direction of flow of the exhaust gases.

* * * * *